United States Patent [19]

Allen et al.

[11] Patent Number: 4,595,718
[45] Date of Patent: Jun. 17, 1986

[54] FLUOROCARBON POLYMER COMPOSITIONS

[75] Inventors: Christopher M. Allen, Mountsorrel; Ian R. Hincklieff, Leicester, both of England

[73] Assignee: USM Corporation, Flemington, N.J.

[21] Appl. No.: 734,548

[22] Filed: Jul. 19, 1985

Related U.S. Application Data

[62] Division of Ser. No. 403,626, filed as PCT GB81/00248, Nov. 19, 1981, published as WO82/01713, May 27, 1982, Pat. No. 4,548,989.

[30] Foreign Application Priority Data

Nov. 21, 1980 [GB] United Kingdom ............... 8037487

[51] Int. Cl.$^4$ ........................... C08F 8/00; B05D 5/00
[52] U.S. Cl. .................................. 523/434; 427/399; 525/101; 525/121
[58] Field of Search ....................... 525/101; 427/399; 523/434

[56] References Cited

U.S. PATENT DOCUMENTS 4,338,376 7/1982 Kritzler ............................. 525/101
4,369,279 1/1983 Emerick ............................ 525/101

FOREIGN PATENT DOCUMENTS 2413426 12/1978 France.
1037672 8/1966 United Kingdom.

OTHER PUBLICATIONS

Lee and Neville; "Handbook of Epoxy Resins", pp. 13-15 and 17-22; McGraw-Hill, 1967, New York, N.Y., TP1180E6, L4.

*Primary Examiner*—Ronald W. Griffin
*Attorney, Agent, or Firm*—Thomas S. Szatkowski

[57] ABSTRACT

The specification describes and claims substantially odourless compositions having a pot life after mixing acceptable for use in manufacture and repair of aircraft and which cure at room temperature to provide a mass of heat and aircraft fuel resistant elastomeric material. The compositions comprise components which are at least substantially free of thiol and comprise a fluorocarbon copolymer, organic solvent, metallic oxide, epoxy compound and as crosslinking agent a diamino silane according to the general formula (i) namely

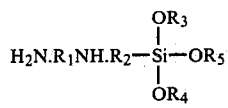

Examples disclose compositions formed from admixture of two components comprising Viton A, methyl ethyl ketone, magnesium oxide, Epikote 828 and N-beta(aminoethyl) gamma-aminopropyl-trimethoxysilane. The compositions are suitable for forming coatings, adhesive bonds and seals, to metal parts of titanium and aluminium alloys which have resistance to aviation fuels and high temperatures. A primer composition for promoting adhesion especially to titanium alloys is described and comprises organic material having isocyanate and hydrolysable silane groups available for reaction e.g. a mixture of polyfunctional isocyanate and a hydrolysable silane of the general formula (ii) namely

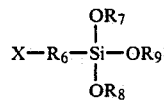

A preferred example primer comprises liquid MDI and gamma-glycidoxy propyl-trimethoxy-silane.

6 Claims, No Drawings

FLUOROCARBON POLYMER COMPOSITIONS

This is a division of application Ser. No. 403,626, filed as PCT GB81/00248, Nov. 19, 1981, published as WO82/01713, May 27, 1982, now U.S. Pat. No. 4,548,989, issued Oct. 22, 1985.

TECHNICAL FIELD

Fluorocarbon polymer compositions are known for use as sealants and adhesives for articles intended to be subjected to high temperature. It is understood that in aircraft which fly at speeds in excess of the speed of sound, heat generated in such areas as wings (which may include fuel tanks) and bodywork adjacent the engine, is sufficient to produce surface temperatures at metal surfaces of the aircraft in excess of 150° C. Coatings, seals, and adhesive bonds in such aircraft are also likely to be exposed to fuels and oils and atmospheric moisture.

BACKGROUND ART

Certain fluorocarbon polymer compositions have found use for example as sealants in the manufacture and repair of supersonic aircraft. Liquid curable compositions for this application can be formulated which cure to an elastomeric state over a period of a few days at ambient temperatures of about 18° to 20° C. or more quickly at higher temperatures. For example, there are disclosed in UK patent specification No. 1037672 two-part curable fluorocarbon polymer compositions comprising a copolymer of hexafluoropropylene with vinylidene fluoride, magnesium oxide, amines, 1:6 hexanedithiol and a silane. The dithiol is a significantly malodorous material, but for many years has been regarded as an important ingredient for the curing of the polymer. Presence of a dithiol in the composition has been regarded as essential in order to achieve compositions which have an adequate "work life" when mixed and are capable of curing to an elastomeric state at room temperature, and of adhering satisfactorily to materials used in aircraft construction for example alloys of titanium and chromate treated or epoxy coated aluminum alloys. Curable compositions using fluorocarbon polymer and dithiol have been used for many years, but it is believed that their offensive odour has inhibited more extensive use of the compositions especially for example where the composition is required to be mixed or applied in a confined working space, or applied to large areas of a workpiece.

Odourless compositions are highly desirable, coupled with the ability to remain usable for a desired length of time after mixing and then become cured to an elastomeric state within an acceptably short time, without application of heat. Not only is it desirable to identify a composition of low odour, and suitable cure characteristics, but also it is necessary to provide a means of achieving good adhesion to metal alloys (for example ones based on titanium or aluminium) which are used in the aircraft construction industry, without promoting unacceptable corrosion of the metal alloys. As far as we are aware, prior to the present invention, no composition has been proposed which satisfied these requirements.

DISCLOSURE OF THE INVENTION

We have now found that an odourless room temperature curable composition having desirable work life and with acceptable non-corrosive properties, may comprise a fluorocarbon copolymer, an organic solvent for the copolymer, a metal oxide, an epoxy resin and selected diamino silane.

The present invention provides in one of its aspects a room temperature curable composition comprising a fluorocarbon copolymer and a metallic oxide, characterised in that the composition is at least substantially free of thiol and comprises a compound having epoxy groups, and as cross-linking agent a diamino silane according to the general formula (i) namely

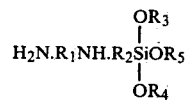

in which
R$_1$ is an aliphatic hydrocarbon residue having 1 to 10 carbon atoms,
R$_2$ is an aliphatic hydrocarbon residue having 1 to 10 carbon atoms, and
R$_3$, R$_4$ and R$_5$ are the same or different monovalent aliphatic hydrocarbon residues having 1 to 5 carbon atoms.

A composition according to the invention is preferably shipped and stored as two separate storage stable components (A) and (B) for admixture at the time of use. Preferably the component (B) consists solely of the cross-linking agent, and the components (A) and (B) are mixed in appropriate proportions to yield a composition of desired pot life and curing characteristics. Compositions according to the invention may be formulated for example for use as coatings, adhesives or sealants and may be laid down in their allotted locations directly from solutions for example by brushing or extrusion or indirectly in the form of substantially solvent free, curable tapes or foils produced from solutions for example by casting.

Suitable fluorocarbon copolymers have desirable solubility and tensile strength characteristics to permit ease of application from solution and adequate strength in the resulting cured mass. Preferred copolymers are comparatively low molecular weight materials e.g. having a Mooney viscosity ML10, 100° C. of about 60 to about 70, formed from the two monomers vinylidene fluoride and hexafluoropropylene in the ratio by weight of about 30:70 to about 70:30. Suitable copolymers are supplied under the trade name Viton (Registered Trade Mark) (for example grades A, A-HV and A-35). These copolymers are believed to be capable of dehydrofluorination under ambient curing conditions, to yeild hydrogen fluoride and a copolymer molecule having ethylenic unsaturation. It is believed that during the course of the curing, the crosslinking agent of the composition becomes linked to the copolymer molecules at the points of ethylenic unsaturation via the amino groups of the silane of formula (i), thus to bring about a crosslinking or chain extension, i.e. a reticulation, of the copolymer molecules.

The metallic oxide assists in the reticulation and also serves to accept hydrogen fluoride produced, e.g. with formation of water. It is necessary to avoid use of those metallic oxides which lead to scorching of the product or incorrect pot life. We prefer to employ a so-called low activity magnesium oxide, in amounts to provide the required cure rate and acceptance of hydrogen fluoride. The low activity magnesium oxide may be used in amounts up to about 30 parts by weight per hundred parts copolymer. However, larger amounts tend to lead to higher cross link density and a less flexible product which may be "scorched", i.e. comparatively weak, comparatively brittle and have poor elongation characteristics. We prefer to employ about 10 parts by weight low activity magnesium oxide per hundred parts by weight copolymer.

The compound having epoxy groups serves as an acid acceptor, and is essential in order to achieve the desired low degree of corrosive properties of the composition. The compound having epoxy groups also serves as an adhesion promotor. Suitable epoxy resins are those which are soluble in solvent used in the composition, and do not interfere significantly with tensile strength of the cured composition. Materials liquid at room temperature are particularly preferred. The amount of epoxy resin used depends to some extent on the epoxide equivalent of the resin, but it is important to ensure that there is sufficient resin present to provide enough epoxy groups to accept acidic materials (e.g. HF) to an adequate extent, but not sufficient resin to significantly interfere adversely with physical properties of the cured composition. Suitable materials include liquid epoxy resins from epichlorhydrin and bisphenol A having an epoxy equivalent weight of about 185 to about 192 and a viscosity at 25° C. or 10,000 to 16,000 centipoises for example Epikote 828. We prefer to use Epikote 828, to an extent of about 2½ to about 10, more preferably about 5 to 7.5, parts by weight per 100 parts by weight copolymer.

An important feature of the silane crosslinking agent is its inoffensive odour. The hydrocarbon residues $R_1$, $R_2$, $R_3$, $R_4$ and $R_5$ are chosen so that the crosslinking agent is a liquid material which is at least substantially non-volatile during normal conditions of use. Preferred diamino silanes are comparatively low viscosity materials having boiling points in the range 200° to 300° C.

We believe that both the primary and secondary amino groups of the silane take part in the curing reaction with the copolymer. The hydrocarbon residue $R_1$ is chosen so that it is of adequate chain length to permit appropriate activity of both the amino groups and thus permit formation of bridges between copolymer molecules via the amino groups, and of appropriate chain length to contribute to desired cohesion and elasticity of the cured composition. The hydrocarbon residue $R_2$ is chosen to be of adequate chain length so that the alkoxy silane grouping does not unduly prejudice the ability of both amino groups to take part in formation of a network with the copolymer molecules. Preferably $R_1$ has two or three carbon atoms in its molecular chain (i.e. is ethyl or propyl) and preferably $R_2$ has two, three or four carbon atoms in its molecular chain (i.e. is ethyl, propyl or butyl). The hydrocarbon residues $R_3$, $R_4$ and $R_5$ are such that the resulting alkoxy groups may partake in appropriate reactions for example with water or metallic substrates for the trialkoxy silane residue of the molecules to serve as an adhesion aid. Preferably $R_3$, $R_4$ and $R_5$ are all the same and are methyl or ethyl groups. We prefer to use N-beta(amino-ethyl)gamma-aminopropyl-trimethoxysilane.

The diamino silane crosslinking agent can be used in appropriate quantities to provide a mixture, for example by admixture of appropriate quantities of components (A) and (B), which remains capable of application for up to ten hours at room temperature, cures at room temperature to a handleable, fuel resistant mass within 48 hours of mixing, and cures at room temperature to an at least substantially fully cured elastomeric mass within seven days. By room temperature where used in this specification, we mean temperatures of about 21° C. ±3° C. It will be understood that more rapid cures can be induced by heating. Irrespective of the curing temperature, it is important to maintain the parts to which the curing mass has been applied in required disposition until the elastomeric and bonding properties are sufficiently developed that the mass in the form of seals, adhesive bonds or coatings does not become damaged or destroyed as by flexing the incompletely cured mass. For a composition intended for room temperature cure, we prefer to arrange that sufficient of the diaminosilane is present in the mixture to provide from about 0.25 to 1.5 parts by weight amino groups of the silane per 100 parts by weight of the preferred fluorocarbon copolymer i.e. about 1.8 to about 10.7 parts by weight of the preferred silane per 100 parts by weight of the preferred fluorocarbon copolymer.

We prefer to use an organic solvent in which the ingredients of the composition, and especially those of component A, are soluble, and which evaporates at room temperature. Preferably the solvent evaporates sufficently quickly to allow rapid formation of a tacky layer of the mixed composition but not so quickly that the work life of the composition is too short, i.e. not so quickly that the layer of composition becomes devoid of the ability to bond under pressure to a similar "dried" layer, applied to it in too short a time. We prefer to employ a volatile ketone e.g. methyl ethyl ketone. It is convenient to include more solvent in compositions intended for coating or adhesive purposes than is necessary in compositions intended for use as sealants for extrusion or use in mastic or tape form. Preferably coating compositions may employ a ketone solvent, or a mixture of solvents including a ketone to an extent such that the component (A) comprises from about 20 to about 35% by weight total solids. Adhesive or sealant compositions may employ the solvent to an extent commensurate with the desired application characteristics, for example for brush application the preferred component (A) may comprise from about 35 to 55% by weight total solids, whereas for extrusion application and particularly for formation of tapes, the preferred component (A) may comprise about 55 to about 65% or more by weight total solids.

We prefer to include reinforcing fillers e.g. carbon black or silica and colourants. For example carbon black may be included to an extent of 30 parts by weight per hundred parts by weight copolymer, commensurate with optimum reinforcing and acceptable cost of the composition.

In order to ensure adequate adhesion (i.e. adhesion sufficient to withstand service at high temperatures in presence of aviation fuels and or moisture) to various substrates including titanium alloys, we have found that a further component (C) must be used with a composition according to the invention, the component (C) being used in the form of a primer. We have found that various primers heretofore proposed (for example amino alkoxy silanes) for use with compositions based on curable fluorocarbon copolymers are not well suited for use with compositions according to the present invention. However, we have found, surprisingly, that excellent adhesive bonds to titanium alloy result when a component (C) is used comprising organic material having isocyanate groups and hydrolysable silane groups available for reaction disposed in organic solvent.

The invention provides in another of its aspects a method of producing a mass of heat and aircraft fuel resistant elastomeric material in the form of a coating, bonding layer or sealant mass adherent to one or more substrates of titanium or aluminium alloy characterised by the steps of forming a substantially solvent free primer coating on one or more of the substrates of titanium or aluminium alloy by application of a primer composition comprising organic material having isocyanate groups and hydrolysable silane groups available for reaction and organic solvent, and providing in contact with the primer coating a room temperature curable composition according to the invention.

In a method according to the invention, the hydrolysable silane and isocyanate groups of the organic material have a significant influence on the ability to achieve consistently good adhesion and heat resistance of masses formed by a method according to the invention. The organic material having isocyanate and hydrolysable silane groups may conveniently be provided by separately available silane and isocyanate compounds. We prefer to employ for this purpose a silane of the general formula

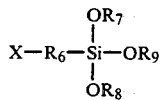

which $R_6$ is a divalent alphatic hydrocarbon residue having 1 to 10 carbon atoms, $R_7$, $R_8$ and $R_9$ are the same or different monovalent aliphatic hydrocarbon residues of sufficient molecular weight that the silane is stable during preparation of the primer and yet do not prejudice hydrolysis of the silane under conditions of use of the primer. Preferably $R_7$, $R_8$ and $R_9$ each have 1 to 5 carbon atoms and more preferably each is a methyl or ethyl group. Preferably the group X includes a grouping capable of a chemical reaction by condensation (for example with isocyanate groups) for example an epoxy, mercapto, amino, or hydroxyl group. Examples of suitable silanes are gamma-glycidoxy propyl trimethoxy silane, gamma amino propyl triethoxy silane, and N-beta (aminoethyl) gamma-aminopropyl-trimethoxysilane. Of these we prefer to employ gamma-glycidoxy propyl trimethoxy silane.

The isocyanate groups are preferably provided by an organic isocyanate of low volatility at normal temperatures of use. Preferably also, the organic isocyanate is polyfunctional e.g. difunctional in order to permit coupling, e.g. a diphenyl methane diisocyanate, and most preferably is a liquid material, for example liquid MDI which is understood to be a 4.4′ diphenyl methane diisocyanate partially reacted to include a minor amount of corbodiimide groups and having an equivalent weight of about 143.

We prefer to employ the silane and diisocyanate in quantities such that the ratio of NCO groups to X groups of the silane is in the range 10:1 to 15:1. Larger or smaller ratios result in poorer adhesion of the composition to titanium substrates.

An important component of the primer composition is organic solvent. This solvent is selected with a view to achieving proper wetting of the substrate by the primer composition, leading to good conditions for adhesion of the primer coating to the substrate. Suitable solvents include N-methyl-2-pyrrolidone, which is preferably employed to provide at least about 10% by volume of the solvent. Other organic liquids may be included in the solvent as additional diluents, for example toluene. Preferably the solvent is used in quantities to provide a solution of from about 5% to 10% total solids.

Plasticising components may be used in the primer composition to enhance flexibility of the primer coating and to contribute to ability of the primer coating to assume suitable bond forming condition on the substrate until the mass according to the invention is applied thereto. Suitable plasticisers include for example butyl benzyl phthalate. Conveniently the plasticiser materials may provide up to 10% preferably about 3% by weight of the primer composition. Minor amounts of stabilizers, fillers, colourants e.g. to provide a characteristic colour in the applied primer may also be included in the primer composition. We have found that the preferred primer composition yields excellent results in those cases in which it is allowed to dry at room temperature for between one and four hours after application of the primer composition and before application of the curable composition. Results achieved when an inadequate drying time is used demonstrate somewhat lower adhesion.

A method according to the invention may be employed for coating, sealing or adhesive bonding of materials intended to be subjected to high temperature for example, and especially certain titanium alloys and aluminium alloys, including aluminium alloys which have a chromate or epoxy coating layer, used for the construction of aircraft.

When using the primer, and compositions formed by mixing components A and B, a primer coating is laid down from a solution on the or each substrate to which adhesion is required, and allowed to dry. The room temperature curable composition according to the invention may then be applied, for example as a tacky curable tape or by deposition from a solution of required solids content as by brushing or extrusion, to the or each primer coated substrate. In the case of a coating or sealant, the or each substrate is then held in desired position until the mass has cured to a condition in which impairment of the coating or seal does not result from movement of the parts. In the case of an adhesive bond, the substrates are pressed together with the primer coating, or coatings, and room temperature curable composition between them and so held until cohesive and adhesive strength of the bond has reached a condition to permit handling of the substrates.

The invention provides in another of its aspects a room temperature curable composition which is at least substantially free of thiol comprising three components (A), (B) and (C) in which the component (A) comprises a fluorocarbon copolymer, a metallic oxide, a liquid epoxy resin, and organic solvent; the component (B) comprises a silane according to the general formula (i); and the component (C) comprises a primer composition comprising organic material having isocyanate groups and hydrolysable silane groups available for reaction and organic solvent, the composition being such that when the component (C) is applied to titanium substrate as a primer composition and the components (A) and (B) are mixed (in proportions to initiate at room temperature reticulation of the fluorocarbon copolymer) and applied to the primed substrate, the composition cures to provide a heat resistant, fuel resistant layer adhesively bonded to the substrate.

MODE FOR CARRYING OUT THE INVENTION

In order that the invention may be more clearly understood there now follows a description of example room temperature curable compositions formed from example components A and B and example primers, of which the illustrative compositions A and B and the illustrative primer are illustrative of most preferred components. There are also described example methods illustrative of methods according to the invention of producing a mass of heat and aircraft fuel resistant elastomeric material adherent to one or more substrates. It will of course be understood that these example materials and methods, have been selected for description to assist in understanding the invention and are not by way of limitation of the invention.

Various components A and curing agents and primers for use therewith were examined as hereinafter referred to, to determine their ability to provide room temperature curable coatings, adhesives and sealants, and to determine the strength and elasticity of the cured compositions and the adhesion and corrosion properties, using the following test procedures.

TENSILE STRENGTH AND ELONGATION AT BREAK

A mixture of component A and an appropriate amount of the selected curing agent was poured onto a PTFE sheet to give an area of approximately 150 mm × 150 mm and a dry film thickness of 0.4 to 0.5 mm. The film was cured for 48 hours at 25° ± 1° C. The film was peeled from the sheet and step-cured for one hour periods at the following temperatures: 75° ± 1° C., 100° ± 2° C., 125° ± 2° C., 150° ± 2° C., 175° ± 3° C., 200° ± 3° C., 220° ± 3° C. The film was allowed to cool to room temperature. Within 24 hours, the tensile strength and elongation at break were determined according to the methods of BS.903:Part A2, using a tensile test machine in which the driven jaw moves at 250 ± 10 mm/min.

ADHESION TO ALUMINUM

Twelve strips of aluminium alloy (BS 3L 72 or 3L 73) 0.5 mm × 115 ± 1 mm × 25 ± 0.25 mm, were degreased by wiping with trichlorethylene and washing them in the vapour thereof. A thin brush coat of primer composition was applied to one surface of each strip and allowed to air dry for 60 minutes. A mixture of component A and an appropriate amount of a selected curing agent was prepared and applied by means of a stiff bristled brush, as a 2 mm minimum coating of adhesive to the primed surface of each strip over 90 mm of its length. The coating was allowed to dry for 15 to 20 minutes. A second similar coating was applied over the first and allowed to dry for 3 hours. The coated strips were assembled in pairs with their coated surface together, and uncoated areas superimposed, and a pressure of 0.4 MPa minimum was applied to ensure complete contact along the joint. Each joint was cured for 48 ± ½ hours at 25° ± 1° C. followed by 24 ± ½ hours at 50° ± 1° C.

"Adhesive strength" recorded in the following tables was determined from two of the sample joints thus prepared by use of a peel test. In the peel test, the sample joints were peeled apart at an angle of 90° in a tensile testing machine fitted with an autographic recorder and with the driven jaw moving at 250 ± 10 mm per minute. The adhesive strength was determined by taking the readings or recorded tracings at regular intervals of 12 to 13 mm, ignoring the first 25 mm of trace and expressing the result as a mean of the 12 readings.

"Adhesive strength (step-cured)" in the following tables was determined from two of the sample joints further cured by a step cure as set forth under "Tensile strength and elongation at break". The step-cured sample joints were peeled apart and the adhesive strength determined as just above described.

"Adhesive strength (fuel immersion)" in the following tables was determined from the remaining two sample joints. These were immersed for 168 ± 1 hours in Turbo Fuel AVTUR to D.Eng.R.D.2453 maintained at 135° ± 2° C. Whilst still immersed the sample joints were cooled to room temperature. These sample joints were peeled apart and the adhesive strength determined as just above described.

ADHESION TO TITANIUM

Samples were prepared for peel tests using strips of titanium TA6 20 cm × 32 mm × 1 mm, and Terylene ribbon strips 22 cm × 32 mm. The titanium strips were thoroughly cleaned with methyl ethyl ketone and dried in air. Primer was applied to each titanium strip and to an 18 cm length of each terylene ribbon and allowed to dry for 60 minutes. A thin layer of a mixture of component A and an appropriate amount of selected curing agent was applied to the titanium strips and the terylene ribbons, and allowed to dry in air at room temperature for 5 minutes. After this time samples were assembled comprising one titanium strip and one terylene ribbon. The two surfaces were pressed thoroughly together to eliminate any entrapped air and a further coat of the mixture applied to the top surface of the terylene and titanium. This was allowed to dry for 30 minutes before applying a final coat of the mixture.

Peel bonds were aged at 25° C. until adhesion built up and then aged in duplicate at 25° C., or 200° C. for specified periods of time.

Testing was carried out by carefully cutting through the adhesive down the sides of the terylene and through the adhesive to the metal at the bond line. A spring balance was then attached to the loose end of the terylene and the load increased slowly, pulling at an angle of approximately 30° until the bond line just started to move. The criterion for satisfactory adhesion being ≧12 lbs. with failure off the metal.

Where failure occurred at the terylene surface, the bond was again cut back to the metal to try to obtain cement-metal failure.

Samples were prepared for shear tests using 2" × 1" titanium strips primed as above. A thin coat of the mixture of component A and the curing agent was applied to 1 square inch of each strip, and the mixture allowed to dry for 15 to 20 minutes. Pairs of the strips were then squeezed together to give a bonded area 1 inch square. The sample bonds were aged in duplicate (a) in air at 25°0 C. and tested after about 1, 4 and 6 weeks (i.e. 6, 30 and 42 days respectively), (b) in Avtur 50 (DERD 2453) and tested after about 4 weeks and 6 weeks (i.e. 30 days and 42 days respectively), or (c) in distilled water and tested after about 4 weeks an 6 weeks (i.e. 30 days and 42 days respectively).

Testing was carried out on a Tensile Testing Machine set to separate the sample bonds at 1" per minute until failure occurred.

CORROSION TESTS

Samples of coated titanium TA6 were prepared from strips of the metal 20 cm×32 mm×1 mm. The strips of metal were thoroughly cleaned with methyl ethyl ketone. Primer was applied and allowed to dry for 60 minutes in air at room temperature. Coatings of a mixture of component A and an appropriate amount of curing agent were applied to the primed titanium strips to provide three-stepped layers of the mixture. These were aged at 25° C. for 2 weeks and then aged at 200° C. and examined visually for corrosion as evidenced by colour changes in the metal surface and deterioration of the adhesion between the coating and the metal surface.

EXAMPLE 1

Example components A were prepared comprising materials in amounts by weight as follows:

| Material | Example components A | | | | |
|---|---|---|---|---|---|
| | A1 | A2 | A3 | A4 | A8 |
| Fluorocarbon polymer | 100 | 100 | 100 | 100 | 100 |
| Carbon black | 30 | 30 | 30 | 30 | 30 |
| Light magnesium oxide | 10 | 10 | 10 | 15 | 10 |
| Epoxy resin 1 | 6.7 | 0 | 0 | 6.7 | 3.35 |
| Epoxy resin 2 | 0 | 0 | 6.7 | 0 | 0 |
| Methyl ethyl ketone | 146.7 | 140 | 146.7 | 151.7 | 143.5 |
| Total solids % by weight | 50% | 50% | 50% | 50% | 50% |

Of these components A, components A1, A3, A4 and A8 are according to the invention, the components A1 and A8 being referred to as illustrative components A.

The fluorocarbon polymer used was Viton A, which is believed to be a copolymer of the two monomers vinylidene fluoride and hexafluoropropylene having a Mooney viscosity ML10, 100° C. of about 59 to 71. The Epoxy resin 1 used was Epikote 828, which is a liquid resin believed to be an epoxy resin from epichlorhydrin and bisphenol A having an epoxy equivalent weight of about 185 to about 192 and a viscosity at 25° C. of 10,000 to 16,000 centipoises. The epoxy resin 2 used was Epikote 1001, which is a solid resin believed to be an epoxy resin from epichlorhydrin and bisphenol A having an epoxide equivalent weight of about 450 to 550 and a Durrans mp of 65° to 75° C.

The curing of mixtures of example component A1 and 2% by weight of potential curing agents in atmosphere at 23° C. was examined. The curing agents and the performance of the mixtures was as follows:

| Curing agents | Performances |
|---|---|
| Hexamethylene diamine | No adhesion to aluminium primed with any primer. |
| Aminoethyl piperazine | No adhesion to aluminium primed with any primer. |
| 4,4'-diaminodiphenyl methane | No curing reaction. |
| Silane 1 | No curing reaction. |
| Silane 6 | Satisfactory performance including adhesion to aluminium and titanium primed with illustrative primer of Example 2. |

The material "Silane 1" was gamma-amino propyl triethoxysilane. The material "Silane 6" was N-beta (amino ethyl) gamma amino propyl trimethoxysilane, hereinafter referred to as the illustrative component B.

The results indicate the specific ability of the chosen diaminosilane to perform satisfactorily as a curing agent at room temperature in atmosphere for example component A1 to form a polymeric mass adherent to appropriately primed aluminium and titanium. In contrast, the other materials examined as curing agents, which included organic diamines and a mono aminosilane proved unsatisfactory in respect of curing or adhesion.

EXAMPLE 2

The effectiveness of various primer compositions in conjunction with a first illustrative composition, prepared from illustrative component A1 and the illustrative component B in ratio by weight of 100 to 1.7, was examined as follows. Primer compositions comprising 2% by weight active ingredient dissolved in appropriate volatile organic solvents were applied to titanium or aluminium surfaces, and the first illustrative composition applied thereto as set forth in the description of various tests given above, in order to provide test samples. These test samples were subjected to the various tests given above, and the performance of the samples was observed. The active ingredients of primer compositions used in the performance of the samples were as follows:

| Primer Composition | Performance |
|---|---|
| Bostik 9289 primer | Failed fuel resistance tests. |
| Solution of equal parts Silane 1 and Silane 2 | Failed fuel resistance tests. |
| Solution of equal parts Silane 1 and Silane 3 | Failed fuel resistance tests. |
| Solution of Silane 2 | Failed fuel resistance tests. |
| Solution of equal parts Silane 2 and Silane 3 | Failed fuel resistance tests. |
| Solution of equal parts Silane 3 and Silane 4 | Failed fuel resistance tests. |
| Solution of Silane 5 | Corrosion of titanium. |
| Solution of equal parts of Silane 5 and a hydroxy functional silicone intermediate | Corrosion on titanium. |
| Solution of equal parts Silane 3 and Silane 5 | Poor adhesion to titanium. |
| Solution of Silane 6 | Poor adhesion to aluminium. |
| Solution of Silane 4 | Failed peel bond test on titanium at 200° C. |
| Illustrative primer 1 | Satisfactory performance on titanium and aluminium. |

In the foregoing table, the various materials are identified as follows:

Bostik 9289 primer; a commercially available aminosilane solution based primer for use with certain thiol cured fluorocarbon based sealant compositions.

Silane 1; gamma-amino propyl triethoxysilane.
Silane 2; vinyl tris(beta-methoxy ethoxy)silane.
Silane 3; methyl trimethoxy silane.
Silane 4; vinyl triacetoxysilane.
Silane 5; gamma-glycidoxypropyl trimethoxy silane.
Silane 6; N-beta(aminoethyl)gamma-aminopropyl-trimethoxysilane.

The illustrative primer, or component C, comprised the following materials:

| Component C | Parts by weight |
|---|---|
| Isonate 143L | 4.07 |

-continued

| Component C | Parts by weight |
|---|---|
| Silane 5 | 0.56 |
| Black dye | 0.04 |
| Butyl benzyl phthalate | 3.3 |
| N—methyl-2-pyrrolidone | 14.00 |
| Toluene | 78.00 |
| NCO:X | 13.4:1 |

Isonate 143 is understood to be a 4.4' diphenyl methane diisocyanate partially reacted to include a minor amount of carbodiimide groups, and is a liquid material having an equivalent weight of about 143.

These results demonstrate the effectiveness of the illustrative primer as compared with the ineffectiveness of the other example primer compositions in conjunction with the illustrative compositions.

In the illustrative primer the ratio of isocyanate groups of the isocyanate used to groups X (glycidoxy) of the silane used was 13.4:1. By way of comparison, primer compositions were prepared using the same ingredients but in varied amounts to yield primer compositions A, B, D and E having NCO:X ratios of 5.5:1; 9.8:1, 15.0:1 and 18.5:1 respectively. These primer compositions together with the illustrative primer were used, freshly prepared, with the first illustrative composition in tests for adhesion to aluminum. The results were as follows:

| Primer composition | A | B | Illustrative | D | E |
|---|---|---|---|---|---|
| Adhesive strength (N) | 70 | 55 | 80 | 80 | 75 |
| Adhesion after step cure (N) | 50 | 87.5 | 90 | 82.5 | 80 |
| Adhesion after fuel immersion (N) | 95 | 75 | 110 | 110 | 110 |

The performance with these five primers indicates that the ratio of isocyanate groups to glycidoxy groups influences the bond-strength results, and that for optimum performance under all three test procedures a ratio of between about 10:1 and 15:1 is to be preferred.

The effectiveness of those primers which contain not only a hydrolysable silane (namely gamma glycidoxypropyl trimethoxysilane referred to as silane 5 above) but also isocyanate, is especially interesting in view of the unacceptability of the primer composition using silane 5 alone as the active ingredient of the primer composition.

Adhesion to aluminium of the first illustrative composition used with the illustrative primer aged at 25° C. for 1 week, 4 weeks and 9 weeks prior to preparation of the test samples was carried out as described above. The results were as follows:

| | 1 WEEK | 4 WEEKS | 9 WEEKS |
|---|---|---|---|
| Adhesive strength | 87 N | 94 N | 126 N |
| Adhesion after step cure | 104 N | 109 N | 90 N |
| Adhesion after fuel immersion | 118 N | 150 N | 120 N |

EXAMPLE 3

Adhesion to aluminium, tensile strength, and elongation at break, were determined using the illustrative primer with the first illustrative composition or using comparative example compositions 1, 2 or 3 prepared from example components A2, A3 and A4 with 1.7 g of illustrative component B per 100 g component A respectively, as room temperature curable adhesive composition. The results were as follows:

| | Tensile and Elongation | |
|---|---|---|
| | Tensile Strength | Elongation at break |
| Illustrative Composition 1 | 5.5 MPa | <400% |
| Comparative example Composition 1 | 10 MPa | <250% |
| Comparative example Composition 2 | 7 MPa | <150% |
| Comparative example Composition 3 | 5.5 MPa | <150% |

| | Adhesion to Aluminium | | |
|---|---|---|---|
| | Adhesive Strength | Adhesive Strength (Step-cured) | Adhesive Strength (Fuel immersion) |
| Illustrative Composition 1 | 80 N | 90 N | 110 N |
| Comparative Composition 1 | 110 N | 75 N | 100 N |
| Comparative Composition 2 | 85 N | 35 N | 35 N |
| Comparative Composition 3 | 110 N | 85 N | 45 N |

These results show that the use of a solid epoxy resin, or an inappropriate level of metallic oxide lead to a poorer combination of adhesive strength, elongation at break and tensile strength. An adequate blend of these properties is achieved by the use of appropriate amounts of selected liquid epoxy compound and metallic oxide. In other words adhesion, and the elastomeric nature of the adhesive bond, are strongly influenced by these materials.

EXAMPLE 4

Adhesion to titanium was determined by the peel tests of the test procedures described above using the first illustrative composition and the illustrative primer. By way of comparison the tests were also carried out using comparative example composition 1 and a second illustrative composition (produced by admixture of component A8 with 1.7 g of the illustrative component B per 100 g of component A) and the illustrative primer. The results are given below:

| Peel Strength in (N/mm width) | | | | | |
|---|---|---|---|---|---|
| Bonds aged at 25° C. | | | | | |
| Days aged at 25° C. | | | | | |
| 8 | 16 | 24 | 32 | 40 | 48 |

-continued

| Peel Strength in (N/mm width) | | | | | | |
|---|---|---|---|---|---|---|
| First Illustrative Composition | (2.30) 16.5 | (2.37) 17 | (2.23) 16 | (2.02) 14.5 | (1.95) 14 | (1.81) 13 |

| Bonds aged at 200° C. | | | | | | | |
|---|---|---|---|---|---|---|---|
| | Days aged at 200° C. | | | | | | |
| | 4 | 8 | 12 | 16 | 20 | 24 | 28 | 32 |
| First Illustrative Composition | (2.78) 20 | (2.78) 20 | (2.78) 20 | (2.64) 19 | (2.50) 18 | (2.30) 16.5 | (2.09) 15 | (1.67) 12 |
| Second Illustrative Composition | (2.64) 19 | (2.50) 18 | (2.50) 18 | (2.44) 17.5 | (2.15) 15.5 | (1.67) 12 | | |
| Comparative Example 1 | (2.64) 19 | (2.64) 19 | (2.57) 18.5 | (2.50) 18 | (1.81) 13 | (1.12) 8 | | |

These results show the improved level of adhesion sustained by use of the illustrative compositions including liquid epoxy compound. They show the acceptable level of peel bond strength on titanium achieved and sustained with the first illustrative composition as compared with the more rapid decrease in the level of peel bond strength achieved with the composition using less epoxy compound, and the unacceptably rapid decrease in peel bond strength with compositions containing no epoxy compound.

EXAMPLE 5

The test procedures for tensile strength, elongation at break, adhesion to aluminium, adhesion to titanium and corrosion tests were conducted as described above, using a component A5 in admixture with 1.7 g of the illustrative component B per 100 g component A5 as room temperature curable adhesive composition (the third illustrative composition), and using the illustrative primer. The component A5 was a variation of component A1 varying solely in using sufficient solvent to provide a mixture of 45% by weight solids. By way of comparison the tests were also conducted using comparative example 4, which was a mixture formed in the prescribed manner from a matched set of Bostik 2221, which is a thiol cured fluorocarbon polymer based two-part sealant commercially available in UK, in conjunction with Bostik primer 9289. The corrosion test procedure was also carried out using the illustrative primer and comparative example composition 1. The results are shown below:

| Tensile and Elongation | | |
|---|---|---|
| | Third Illustrative Composition | Comparative Example 4 |
| Tensile strength of film | 5.5–6.7 MPa | 8.3–10 MPa |
| Elongation at break | 250–400% | 200–350% |

| Adhesion to Aluminium | | |
|---|---|---|
| | Third Illustrative Composition | Comparative Example 4 |
| Adhesive strength | 80–95 N | 110–200 N |
| Adhesion after step-cure | >90 N | 90–140 N |
| Adhesion after fuel immersion | 110 N | 110–180 N |

These results show that the third illustrative composition is likely to be acceptable in performance.

| Adhesion to titanium | | | |
|---|---|---|---|
| | 6 Days | 30 Days | 42 Days |
| Ageing at 25° C. - Shear tests | | | |
| Third Illustrative Composition | 1020 N (229 lbs) | 1100 N (247 lbs) | 1050 N (236 lbs) |
| Comparative Example 4 | 900 N (202 lbs) | 1150 N (259 lbs) | 1175 N (264 lbs) |
| Ageing in AVTUR 50 @ 25° C. - Shear tests | | | |
| Third Illustrative Composition | | 1075 N (242 lbs) | 950 N (214 lbs) |
| Comparative Example 4 | | 1020 N (229 lbs) | 975 N (219 lbs) |
| Ageing in distilled water @ 25° C. - Shear tests | | | |
| Third Illustrative Composition | | 960 N (216 lbs) | 850 N (191 lbs) |
| Comparative Example 4 | | 980 N (220 lbs) | 780 N (175 lbs) |

| Corrosion tests on Titanium | | | |
|---|---|---|---|
| | Third Illustrative Composition | Comparative Example 1 | Comparative Example 4 |
| 4 Days | Metal yellow good adhesion no corrosion. | Metal yellow good adhesion no corrosion. | Metal yellow good adhesion no corrosion. |
| 14 Days | No change. | Slight corrosion, good adhesion. | No change. |
| 28 Days | Metal darkening, good adhesion. | Significant corrosion. Composition peels very easily. | Composition peels easily, no attack. |
| 42 Days | Further darkening, composition off. | — peels | No change. |

These results show adhesion to titanium of the third illustrative composition is comparable to that of comparative example 4, and corrosion properties are more favourable than those of comparative example 4, and even more favourable than those of comparative example 1 in which the component A2 contains no epoxy compound.

EXAMPLE 6

Variations of example component A1 were made up with different quantities of solvent so that these variations, namely the example component A5 and example components A6 and A7, comprised 45%, 25% and 60% by weight respectively of solids. Example components A5 and A6 are more suited to brush application whereas example component A7 is more suited to extrusion application.

It was found that pot lives of about 6 hours, 24 hours, and 4 hours were exhibited when the illustrative component B was mixed in amounts of 1.7, 1.7 and 2.4 g respectively with 100 g of example components A5, A6 and A7 respectively to provide the third, fourth and fifth illustrative compositions respectively. It will be apparent that by appropriate selection of the solids content of the component A and of the ratio of amounts of components A and B used, a suitable consistency and work life of the mixed composition may be achieved, so that a variety of adhesive bonding, coating and sealing operations may be carried out in a variety of ways. For example the fourth illustrative composition may be used to provide a protective coating on a surface of aluminium or titanium metal parts joined together in abutting or overlapping relation as by rivets or bolts. In such a procedure, the illustrative primer is applied by brush or spray to the area to be coated and allowed to dry for one hour, giving a very thin substantially solvent free primer coating, on the area to be coated. The fourth illustrative composition, which was of comparatively low viscosity is then brushed or flowed onto the area and allowed to dry, to provide a coating of about 0.5 mm thick. If desired, more than one coating of the composition may be so applied. The coating is allowed to cure by ageing at room temperature for 48 hours or more and is found to provide a coherent coating of heat and aircraft fuel resistant elastomeric material strongly adherent to the metal.

The third illustrative composition may be used for example as an adhesive and to strengthen and seal joints between metal parts of aluminium or titanium. In such a procedure, the illustrative primer is applied by brush or spray to the surface of each of two metal parts to be bonded and allowed to dry for one hour giving a very thin substantially solvent free primer coating. The third illustrative composition is then applied by brush onto the primer coating on each surface, and allowed to dry. The metal parts are then brought together with the coatings in contact, and clamped together by a temporary clamp, e.g. a press, or by a clamp means intended to remain in the parts, for example bolts and nuts. The assembly is aged at room temperature, for example overnight, and then the temporary clamp means may be removed. The cured composition provides a heat and aircraft fuel resistant elastomeric material adherent to, and sealing the joint between, the two metal parts.

The fifth illustrative composition may be used for example to seal gaps in assembled structures of titanium. In such a procedure the illustrative primer is applied to the metal surfaces adjacent the gap and allowed to dry for one hour to provide a substantially solvent free primer coating. The fifth illustrative composition is then applied by extrusion from a suitable extrusion applicator to fill the gap. The composition is cured by ageing at room temperature e.g. overnight, to provide a mass of heat and aircraft fuel resistant elastomeric material adherent to the metal surfaces.

We claim:

1. A method of producing a mass of heat and aircraft fuel resistant elastomeric material in the form of a coating bonding layer or sealant mass adherent to one or more substrates of titanium or aluminium alloy characterised by the steps of forming a substantially solvent free primer coating on one or more substrates of titanium or aluminium alloy by application of a primer composition comprising organic material having isocyanate groups and hydrolysable silane groups available for reaction and organic solvent, and providing in contact with the primer coating a room temperature curable composition which comprises a fluorocarbon copolymer and a metallic oxide, characterised in that the composition is at least substanially free of thiol and comprises a compound having epoxy groups, and as crosslinking agent a diamino silane according to the general formula (i) namely

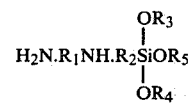

in which
$R_1$ is an aliphatic hydrocarbon residue having 1 to 10 carbon atoms,
$R_2$ is an aliphatic hydrocarbon residue having 1 to 10 carbon atoms, and
$R_3$, $R_4$ and $R_5$ are the same or different monovalent aliphatic hydrocarbon residues having 1 to 5 carbon atoms.

2. A method according to claim 1 characterised in that the primer composition is prepared by admixture of an organic polyisocyanate and a silane according to the general formula (ii) namely

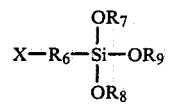

in which
$R_6$ is a divalent aliphatic hydrocarbon residue having 1 to 10 carbon atoms,
$R_7$, $R_8$ and $R_9$ are the same or different monovalent aliphatic hydrocarbon residues having 1 to 5 carbon atoms, and,
X is a grouping capable of a chemical reaction by condensation which comprises an epoxy, mercapto, amino or hydroxy group,
the polyisocyanate and silane being used in amounts to provide a ratio of isocyanate groups to groups X of about 10:1 to 15;1.

3. A method according to claim 2 characterised in that the organic polyisocyanate comprises a 4.4' diphenyl methane diisocyanate partially reacted to include a minor amount of carbodiimide groups and in that the silane of general formula (ii) comprises gamma-glycidoxypropyl-trimethoxy-silane.

4. A method according to any one of claims 1 to 3 characterised in that the primer composition comprises a solution of from about 5 to 10% total solids, the organic solvent comprising N-methyl-2-pyrrolidone and toluene.

5. A method according to any one of claims 1 to 4 wherein the room temperature curable composition is provided in the form of a tacky, curable tape, or in the form of a layer deposited on the substrate from a solution.

6. A room temperature curable composition which is at least substantially free of thiol comprising three components (A), (B) and (C) in which the component (A) comprises a fluorocarbon copolymer, a metallic oxide, a liquid epoxy resin, and organic solvent; the component (B) comprises a silane according to the general formula (i) namely $$H_2N.R_1NH.R_2Si\begin{matrix}OR_3\\|\\|\\OR_4\end{matrix}OR_5$$

in which $R_1$ is an aliphatic hydrocarbon residue having 1 to 10 carbon atoms, $R_2$ is an aliphatic hydrocarbon residue having 1 to 10 carbon atoms, and $R_3$, $R_4$ and $R_5$ are the same or different monovalent aliphatic hydrocarbon residues having 1 to 5 carbon atoms; and the component (C) comprises a primer composition comprising organic material having isocyanate groups and hydrolysable silane groups available for reaction and organic solvent, the composition being such that when the component (C) is applied to titanium substrate as a primer composition and the components (A) and (B) are mixed (in proportions to initiate at room temperature reticulation of the fluorocarbon copolymer) and applied to the primed substrate, the composition cures to provide a heat resistant, fuel resistant layer adhesively bonded to the substrate.

* * * * *